(12) United States Patent
Ha

(10) Patent No.: US 12,520,658 B2
(45) Date of Patent: Jan. 6, 2026

(54) DISPLAY APPARATUS

(71) Applicant: LG Display Co., Ltd., Seoul (KR)

(72) Inventor: Jongmoo Ha, Gimpo-si (KR)

(73) Assignee: LG Display Co., Ltd., Seoul (KR)

(*) Notice: Subject to any disclaimer, the term of this patent is extended or adjusted under 35 U.S.C. 154(b) by 532 days.

(21) Appl. No.: 17/991,511

(22) Filed: Nov. 21, 2022

(65) Prior Publication Data

US 2023/0200107 A1    Jun. 22, 2023

(30) Foreign Application Priority Data

Dec. 20, 2021   (KR) .................. 10-2021-0182578

(51) Int. Cl.
  *G06F 3/041*    (2006.01)
  *H10K 50/822*   (2023.01)
  *H10K 59/122*   (2023.01)
  *H10K 59/40*    (2023.01)

(52) U.S. Cl.
  CPC ....... *H10K 50/822* (2023.02); *G06F 3/04164* (2019.05); *H10K 59/122* (2023.02); *H10K 59/40* (2023.02); *G06F 3/0412* (2013.01); *G06F 2203/04103* (2013.01); *G06F 2203/04107* (2013.01)

(58) Field of Classification Search
  CPC . G06F 2203/04103; G06F 2203/04107; G06F 2203/04111; G06F 3/0412; G06F 3/04164; G06F 3/0443; G06F 3/0446; H10K 50/82; H10K 50/822; H10K 50/8426; H10K 50/844; H10K 59/122; H10K 59/131; H10K 59/40
  See application file for complete search history.

(56) References Cited

U.S. PATENT DOCUMENTS

| | | | |
|---|---|---|---|
| 11,221,702 B2 | 1/2022 | Won et al. | |
| 2018/0329552 A1* | 11/2018 | Song | G06F 3/044 |
| 2019/0189731 A1* | 6/2019 | Managaki | G06F 3/04164 |
| 2021/0200364 A1 | 7/2021 | Won et al. | |
| 2022/0100307 A1 | 3/2022 | Won et al. | |

FOREIGN PATENT DOCUMENTS

KR   10-2021-0083841 A   7/2021

* cited by examiner

*Primary Examiner* — Insa Sadio
(74) *Attorney, Agent, or Firm* — Fenwick & West LLP

(57) ABSTRACT

Provided is a display apparatus. The display apparatus includes a substrate including an active area and an inactive area disposed around the active area, a light emitting element disposed in the active area and including an anode, an emission layer and a cathode, an encapsulation layer disposed on the light emitting element and including a first and second inorganic insulating layer and an organic insulating layer, a touch part disposed on the encapsulation layer and including a first touch insulating layer, a touch electrode part and a second touch insulating layer, a contact hole disposed in the inactive area and exposing an upper portion of the cathode covering the entire active area and a part of the inactive area; and a first electrode electrically connected to the cathode through the contact hole in the inactive area. The touch electrode part and the first electrode are made of the same material.

25 Claims, 5 Drawing Sheets

DISPLAY APPARATUS

CROSS-REFERENCE TO RELATED APPLICATIONS

This application claims the priority of Republic of Korea Patent Application No. 10-2021-0182578 filed on Dec. 20, 2021, in the Korean Intellectual Property Office, which is hereby incorporated by reference as if fully set forth herein.

BACKGROUND

Technical Field

The present disclosure relates to a display apparatus.

Description of the Related Art

As society advances to the information-oriented society, the field of display for visually expressing an electrical information signal has rapidly advanced. Various display apparatuses, having excellent characteristics in terms of thin profile, light weight, and low power consumption, are being developed.

Examples of the display apparatuses include liquid crystal display (LCD) apparatuses, organic light emitting display (OLED) apparatuses, quantum dot (QD) display apparatuses, etc.

An OLED apparatus may include a display panel and a plurality of components for providing various functions. For example, one or more display driving circuits for controlling the display panel may be included in a display assembly.

Examples of the display driving circuits may include gate drivers, light emission (source) drivers, electric power (VDD) routing circuits, electrostatic discharge (ESD) circuits, multiplexer (MUX) circuits, data signal lines, cathode contacts and other functional elements.

A plurality of peripheral circuits for providing various kinds of additional functions, for example, a touch sensing function and a fingerprint identification function may also be included in the display assembly. Some components may be disposed on the display panel, or may be disposed on a non-display area or an inactive area adjacent to a display area or an active area.

An organic light emitting element used in the OLED display apparatus is a self-emitting element including an emission layer between two electrodes. In the organic light emitting element, electrons and holes are injected into the emission layer from an electron injection electrode and a hole injection electrode, respectively. The organic light emitting element emits light when excitons created by recombination of the injected electrons and holes transition from an excited state to a ground state. The electron injection electrode may be an upper electrode or a cathode, and the hole injection electrode may be a lower electrode or an anode. The cathode needs to be connected to a low-potential power line, and a contact structure for connection may be disposed in the non-display area.

The size of a display apparatus is an important factor in design. For example, a high ratio of the size of an active area to the size of an inactive area, which is referred to as a screen to bezel ratio may be one of main characteristics. However, when some of the above-described components are disposed in the display assembly and the contact structure of the cathode and the low-potential power line is disposed outside the component, a large non-display area is needed. The contact structure of the cathode and the low-potential power line disposed outside the component may be easily exposed to permeation of external moisture generated at cracks in a trimming line of a substrate which is a trimming line in an outermost non-display area of the substrate. Accordingly, to protect the element from permeation of the external moisture, a certain distance from the trimming line of the substrate is needed in the outside of the contact structure of the cathode and the low-potential power line. Thus, there is a limitation on reducing a bezel area.

SUMMARY

As display apparatuses have been diversifying, users have preferred mobile products with a higher device to screen ratio. In order to increase the device to screen ratio, for example, efforts to implement a narrow bezel having an inactive area narrower than an active area have been made.

In order to implement the narrow bezel, various techniques including the placement of components such as a gate driver or an electro-static discharge (ESD) and an optimal driving method may be needed. Also, it is necessary to place an encapsulation layer and an anti-moisture permeation structure so as to protect light emitting elements in the active area from the external oxygen or moisture well while efficiently using the space of the inactive area.

Further, in order to implement the narrow bezel, efforts to simplify or optimize a structure in grounding a cathode are being continuously formed.

Accordingly, embodiments of the present disclosure are directed to an apparatus that substantially obviates one or more of the problems due to limitations and disadvantages of the related art.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these other aspects of the inventive concepts, as embodied and broadly described herein, the display apparatus comprises a substrate including an active area and an inactive area disposed around the active area. The display apparatus also includes a light emitting element disposed in the active area and including an anode, an emission layer and a cathode. The display apparatus further includes an encapsulation layer disposed on the light emitting element and including a first inorganic insulating layer, an organic insulating layer and a second inorganic insulating layer. The display apparatus also includes a touch part disposed on the encapsulation layer and including a first touch insulating layer, a touch electrode part and a second touch insulating layer. The display apparatus further includes a contact hole disposed in the inactive area and exposing an upper portion of the cathode extended from the active area to the inactive area. The display apparatus also includes a first electrode electrically connected to the cathode through the contact hole in the inactive area. The touch electrode part and the first electrode may be made of the same material or the substantially same material.

According to an embodiment of the present disclosure, a cathode ground structure for driving a light emitting element is simplified. Thus, it is possible to minimize an inactive area outside an active area or a side bezel area of a panel in the inactive area.

According to an embodiment of the present disclosure, a connection structure between a connection electrode made of the same material or the substantially same material as a cathode or an anode used in the bezel area and a low-potential power line made of the same material or the substantially same material as source/drain electrodes can be simplified.

According to an embodiment of the present disclosure, a connection structure among the cathode, the connection electrode and the low-potential power line can be simplified. Also, the size of the bezel area occupied by the connection structure for grounding of the cathode can be reduced. Thus, the bezel area can be minimized so that a user of a display apparatus may use an aesthetic device having a full light emission screen on the front surface of the display apparatus. Also, since a compact module that can be applied to a narrow bezel is used, a display apparatus with excellent grip and light weight can be provided to the user.

According to an embodiment of the present disclosure, a display apparatus includes a substrate including an active area and an inactive area, at least one light emitting element disposed in the active area, the at least one light emitting element including an anode, an emission layer, and a at least a part of a cathode, a second part of the cathode in the inactive area of the substrate, an encapsulation layer disposed on the light emitting element, a touch part and one or more touch routing lines disposed on the encapsulation layer, wherein the one or more touch routing lines electrically connect the touch part to a touch pad, a gate driver disposed in the inactive area of the substrate, and a first electrode formed in a same layer as a part of the touch part, wherein the first electrode contacts the second part of the cathode, and the first electrode overlaps with the gate driver.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
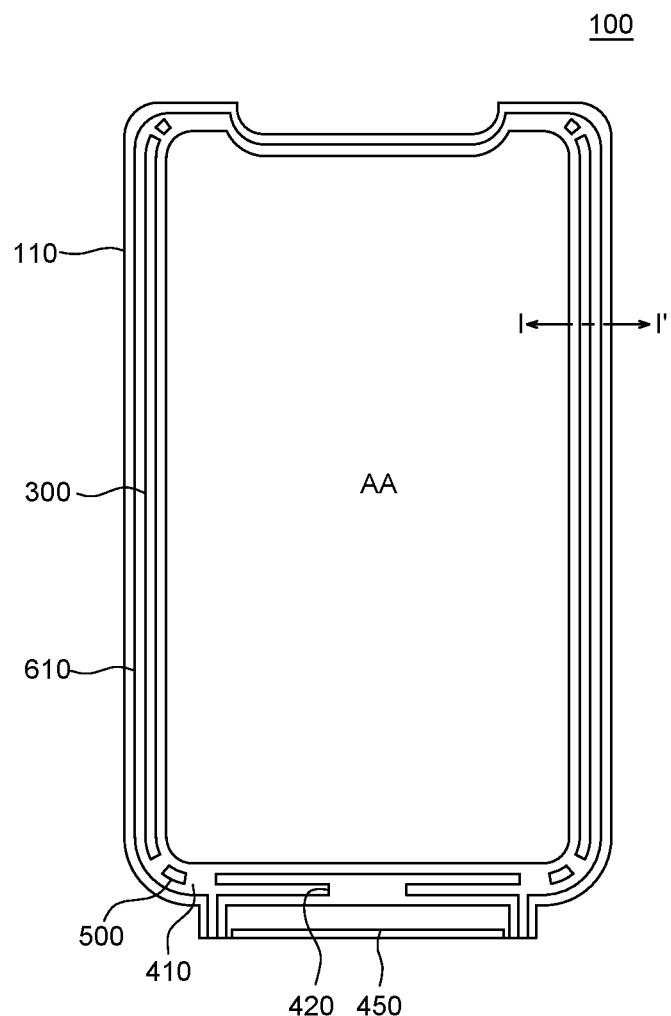
FIG. 1 illustrates a display panel according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

The shapes, sizes, ratios, angles, numbers, and the like disclosed in the drawings for describing embodiments of the present disclosure are merely examples, and thus, the present disclosure is not limited to the illustrated details. Like reference numerals refer to like elements throughout. IN the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

In describing a position relationship, for example, when a position relation between two parts is described as, for example, "on," "over," "under," and "next," one or more other parts may be disposed between the two parts unless a more limiting term, such as "just" or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A size and a thickness of each component illustrated in the drawing are illustrated for convenience of description, and the present disclosure is not limited to the size and the thickness of the component illustrated.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to accompanying drawings. For convenience of description, a scale of each of elements illustrated in the accompanying drawings differs from a real scale, and thus, is not limited to a scale illustrated in the drawings.

In the present disclosure, a display apparatus may include a liquid crystal module (LCM) including a display panel and a driver for driving the display panel, an organic light emitting display module (OLED module), and a quantum dot module (QD module). In addition, the display apparatus may also include equipment display apparatus including complete product or final product of LCM, OLED or QD module, for example, notebook computer, television, computer monitor, automotive display apparatus, or other vehicle display apparatuses, and set electronic devices or set device (set apparatus) such as mobile electronic devices of smart phone or electronic pad.

Accordingly, the display apparatus according to the present disclosure may include application products or set apparatuses such as final products including the LCM, OLED or QD module as well as display apparatuses such as LCM, OLED or QD module.

If needed, the LCM, OLED or QD module configured as the display panel, the driver, and the like may be expressed as the "display apparatus", and the electronic device of the final product including the LCM, OLED or QD module may be expressed as the "set apparatus". For example, the display apparatus may include a display panel of LCD, OLED or QD, and a source printed circuit board (source PCB) as a controller for driving the display panel. Meanwhile, the set apparatus may further include a set PCB as a set controller, which is electrically connected to the source PCB, so as to control the entire set apparatus.

The display panel used for the present embodiment may be all types of display panels, for example, a liquid crystal display panel, an organic light emitting diode OLED display panel, a quantum dot QD display panel, an electroluminescent display panel, and the like. The display panel is not limited to a particular display panel including a flexible substrate for an OLED display panel and a backplane support structure disposed beneath the display panel, thereby being capable of achieving bezel bending. The display panel used in the display apparatus according to an embodiment of the present disclosure is not limited in shape and size.

More specifically, when the display panel is an OLED display panel, the display panel may include a plurality of gate lines, a plurality of data lines, and a plurality of pixels PXL provided in respective intersections between the gate lines and the data lines. In addition, the display panel may further include an array including thin film transistors as elements for selectively applying a voltage to each of the pixels, an OLED layer disposed on the array, and an encapsulation substrate or an encapsulation layer disposed on the array to cover the OLED layer. The encapsulation layer protects the thin film transistors and the OLED layer from external impact and suppresses the permeation of moisture or oxygen into the OLED layer. Layers formed on the array may include an inorganic light emitting layer, for example, a nano-sized material layer or a quantum dot layer, and the like.

Hereinafter, a display apparatus of which an inactive area outside an active area or a side bezel area of a panel in the inactive area can be reduced or minimized by simplifying a cathode ground structure for driving a light emitting element will be described in detail.

In the present disclosure, FIG. 1 illustrates an organic light emitting diode (OLED) display panel 100 that may be integrated into display apparatuses.

FIG. 1 illustrates a display panel according to an embodiment of the present disclosure.

With reference to FIG. 1, the OLED display panel 100 includes at least one active area AA in which organic light emitting elements (or organic light emitting devices) and an array for driving the organic light emitting elements are formed.

The display panel 100 may include an inactive area IA disposed around the active area AA, and the top, bottom, left and right edges of the active area AA may be referred to as the inactive area IA. The active area AA may have a rectangular shape or a shape with a notch and rounded corners, but is not limited thereto. Various types of display apparatuses such as a circle, an oval or a polygon may be applied to a smart watch or a display apparatus for a vehicle. Accordingly, the placement of the inactive areas IA surrounding the active area AA is not limited to the OLED display panel 100 illustrated in FIG. 1. Various components for driving light emitting elements and arrays disposed in the active area AA are located in the left and right inactive areas IA of the active area AA and thus provide a function for stable light emission. For example, there may be circuits, such as a gate-in-panel (GIP) circuit (or gate driver) 300 and an electrostatic discharge circuit (or ESD) 500, and an area for contact between an upper electrode or a cathode, which is a part of the light emitting element, and a low-potential voltage line (VSS) 410, which is a voltage reference point of the light emitting element. Also, there may be a plurality of dams configured to prevent overflowing to the outside of the display panel 100 during a coating process of a particle cover layer of an encapsulation layer configured to protect the light emitting element from external moisture or foreign materials.

The display panel 100 according to an embodiment of the present disclosure may include a thin film transistor array substrate including a plurality of pixels defined by a plurality of gate lines and a plurality of data lines and a thin film transistor provided in each pixel for driving each pixel. The display panel 100 according to an embodiment of the present disclosure may also include an organic light emitting element layer provided on the thin film transistor array substrate and an encapsulation layer covering the organic light emitting element layer. Here, the encapsulation layer protects the thin film transistor and the organic light emitting element layer from the external impact and suppresses the permeation of moisture through the organic light emitting element layer.

With reference to FIG. 1, a flexible printed circuit board (FPCB) electrically connected to a pad 450 formed to receive a data driving signal or to exchange a touch signal with an external power source may be provided in a lower area of the display panel 100. A high-potential power (VDD) line 420, a VSS line 410 and/or data voltage lines extended from the FPCB may be disposed. The VSS line 410 may be used to form a reference voltage of the element in the active area AA, and may be disposed to surround the active area AA in order to lower a resistance. The VDD line 420 and the VSS line 410 may be disposed adjacent to the pad 450 and made of the same material or the substantially same material as source/drain electrodes of the thin film transistor. The VSS line 410 adjacent to an area where the ESD 500 and the gate driver 300 are disposed may be connected to a first electrode 610 through a different line. Herein, the first electrode 610 may be referred to as a connection electrode or an extension line, but is not limited to the term. The first electrode 610 may be disposed to surround three surfaces of the active area AA except for one surface on which the pad 450 is disposed, and may have a connection structure for connection to the upper electrode.

The data voltage lines of the present disclosure may be disposed to be connected to a data driver IC that generates an emission signal of the light emitting element.

An area where the pad 450 is disposed may be a second component formation part. The VDD line 420 and a part of the VSS line 410 may be disposed in the second component formation part.

A member connected to the pad 450 formed on a top surface of the display panel 100 is not limited to the FPCB, and various members can be connected. The pad 450 can also be disposed on the top surface or a rear surface of the display panel 100.

The substrate 110 that is the basis of the display panel 100 may be made of various materials such as glass, metal or plastic. If the substrate 110 is a flexible substrate, the substrate 110 may include, for example, a polymer resin such as polyethersulphone (PES), polyacrylate (PAR), polyetherimide (PEI), polyethylene naphthalate (PEN), polyethyleneterephthalate (PET), polyphenylene sulfide (PPS), polyarylate, polyimide (PI), polycarbonate (PC), or cellulose acetate propionate (CAP). However, the present disclosure is not limited thereto.

Further, the substrate 110 may have a structure including two plastic substrates and an inorganic layer between the two plastic substrates. The two plastic substrates may include the above-described polymer resin and may have the same thickness or different thicknesses. For example, each of the two plastic substrates may include polyimide and may have a thickness of 3 μm to 20 μm. The inorganic layer may be a barrier layer that suppresses the permeation of foreign materials from the outside. For example, the inorganic layer may be formed as a single layer or a plurality of layers including an inorganic material such as silicon nitride (SiNx) and/or silicon oxide (SiOx), but is not limited thereto. The inorganic layer may have a thickness of about 6000 Å. However, the present disclosure is not limited thereto.

Figure 2:
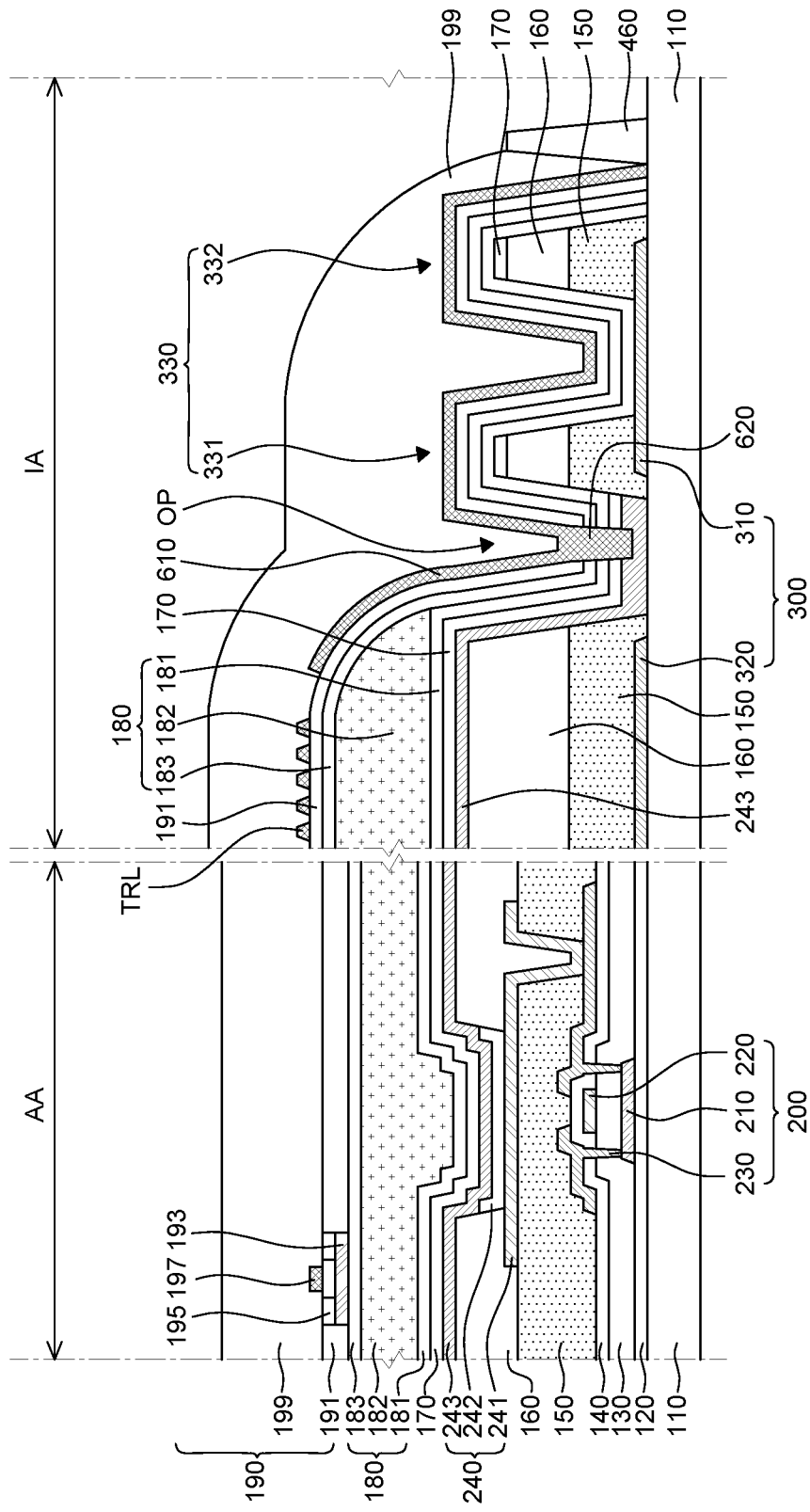
FIG. 2 is a cross-sectional view taken along a line I-I' of FIG. 1 according to an embodiment of the present disclosure.
Figure 3:
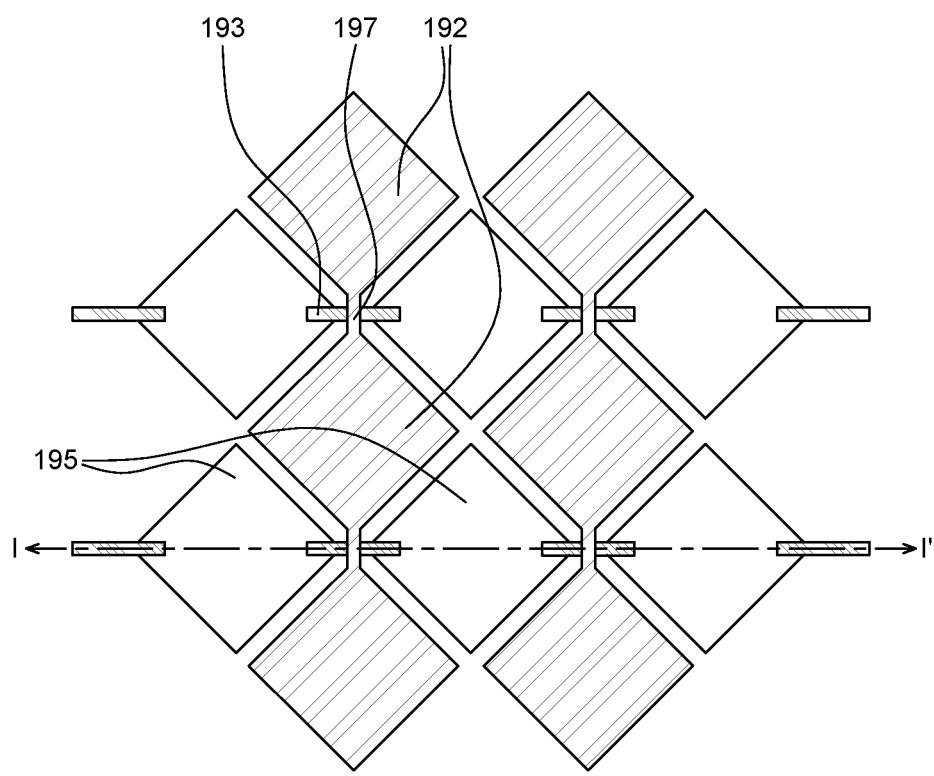
FIG. 3 is a plan view of a touch electrode part taken along the line I-I' of FIG. 1 according to an embodiment of the present disclosure.

FIG. 2 is a cross-sectional view taken along a line I-I' of FIG. 1, and FIG. 3 is a plan view of a touch electrode part disposed in the active area AA as taken along the line I-I' of FIG. 1 according to embodiments of the present disclosure.

A thin film transistor 200 is disposed in the active area AA of the substrate 110. In addition to the thin film transistor 200, a display element electrically connected to the thin film transistor 200 may also be disposed in the active area AA.

FIG. 2 illustrates an organic light emitting element 240 as the display element. Hereinafter, it will be described that the display panel 100 according to the embodiment of the present disclosure includes the organic light emitting element 240 as the display element. When the organic light emitting element 240 is electrically connected to the thin film transistor 200, an anode 241 included in the organic light emitting element 240 may be electrically connected to the thin film transistor 200. The thin film transistor 200 may also be disposed in the peripheral inactive area IA of the substrate 110. The thin film transistor 200 disposed in the inactive area IA may be, for example, the gate driver 300 for controlling an electrical signal applied to the active area AA.

The thin film transistor 200 includes a semiconductor layer 210 including amorphous silicon, polycrystalline silicon, or an organic semiconductor material, a gate electrode 220, and source/drain electrodes 230. A buffer layer 120 may be disposed on the substrate 110 to flatten a surface of the substrate 110 or suppress the permeation of impurities into the semiconductor layer 210. For example, the buffer layer 120 may be made of SiOx, SiNx or silicon oxynitride (SiON), but is not limited thereto. The semiconductor layer 210 may be disposed on the buffer layer 120.

The gate electrode 220 may be disposed on the semiconductor layer 210. The gate electrode 220 may be made of a metal in consideration of adhesion to adjacent layers, surface flatness of the layer to be stacked, and processability. For example, the gate electrode 220 may be formed as a single layer or a plurality of layers of one or more of aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W) and copper (Cu). However, the present disclosure is not limited thereto. A gate insulating layer 130 may be interposed between the semiconductor layer 210 and the gate electrode 220. For example, the gate insulating layer 130 may secure insulating properties between the semiconductor layer 210 and the gate electrode 220. For example, the gate insulating layer 130 may be made of SiOx, SiNx or SiON, but is not limited thereto. An inorganic insulating layer 140 may be disposed on the gate electrode 220. For example, the inorganic insulating layer 140 may be formed as a single layer or a plurality of layers of SiOx, SiNx or SiON, but is not limited thereto.

The source/drain electrodes 230 are disposed on the inorganic insulating layer 140. The source/drain electrodes 230 are electrically connected to the semiconductor layer 210 through respective contact holes formed in the inorganic insulating layer 140 and the gate insulating layer 130.

The source/drain electrodes 230 may be formed as a single layer or a plurality of layers of one or more of Al, Pt, Pd, Ag, Mg, Au, Ni, Nd, Ir, Cr, Li, Ca, Mo, Ti, W and Cu, but is not limited thereto.

A protective film covering the thin film transistor 200 may be disposed in order to protect the thin film transistor 200. The protective film may protect the thin film transistor 200. The protective film may be made of an inorganic material such as SiOx, SiNx or SiON, but is not limited thereto. The protective film may be formed as a single layer or a plurality of layers.

A planarization layer 150 may be disposed on the protective film. For example, when the organic light emitting element 240 is disposed on the thin film transistor 200 as shown in FIG. 2, the planarization layer 150 may substantially flatten an upper portion of the protective film covering the thin film transistor 200. The planarization layer 150 may include an organic material including a general purpose polymer such as polymethylmethacrylate (PMMA) or polystyrene (PS), a polymer derivative having a phenolic group, an acryl-based polymer, an imide-based polymer, an aryl ether-based polymer, an amide-based polymer, a fluorine-based polymer, a p-xylene-based polymer, a vinyl alcohol-based polymer, and blends thereof. However, the present disclosure is not limited thereto. Although the planarization layer 150 is shown as a single layer in FIG. 2, various modifications such as a plurality of layers are possible. The display panel 100 according to an embodiment of the present disclosure may have the protective film and the planarization layer 150 or may have only the planarization layer 150 as necessary. The planarization layer 150 may be referred to as an insulating layer or a first insulating layer, but is not limited to the term.

In the active area AA of the substrate 110, the anode 241, a cathode 243 and an organic light emitting stack 242 including an emission layer and interposed therebetween is disposed on the planarization layer 150. The anode 241, the organic light emitting stack 242 and the cathode 243 may be collectively referred to as the organic light emitting element 240. For example, the organic light emitting element 240 is an element for emitting light and may include the anode 241, the organic light emitting stack 242, and the cathode 243.

The planarization layer 150 may have an opening exposing at least one of the source/drain electrodes 230 of the thin film transistor 200. The anode 241, which is contacted with any one of the source/drain electrodes 230 through the opening and electrically connected to the thin film transistor 200, is disposed on the planarization layer 150. The anode 241 may be a (semi)transparent electrode or a reflective electrode. The anode 241 may include various materials and may have a structure of a single layer or a plurality of layers. Various modifications thereof can be made. The anode 241 according to an embodiment of the present disclosure may be referred to as a lower electrode, a pixel electrode or a first electrode, but is not limited to the term.

A bank layer 160 may be disposed on the planarization layer 150. The bank layer 160 may define a pixel by having an opening corresponding to each subpixel, for example, an opening through which at least a central portion of the anode 241 is exposed. Also, as shown in FIG. 2, the bank layer 160 increases a distance between an edge of the anode 241 and the cathode 243 over the anode 241 and thus can suppress the occurrence of arcs at the edge of the anode 241. The bank layer 160 may be made of, for example, an organic material such as PI or hexamethyldisiloxane (HMDSO), but is not limited thereto. The bank layer 160 may be referred to as a second insulating layer or a pixel defining layer, but is not limited to the term.

An intermediate layer of the organic light emitting stack 242 may include a low molecular weight or high molecular weight material. When the intermediate layer includes a low molecular weight material, the intermediate layer may have a single or complex structure in which a hole injection layer (HIL), a hole transport layer (HTL), an emission layer (EML), an electron transport layer (ETL), an electron injection layer (EIL), and the like are laminated. However, the present disclosure is not limited thereto. The intermediate layer may include various organic materials such as copper phthalocyanine (CuPc), N,N-di(naphthalen-1-yl)-N,N'-diphenyl-benzidine (NPB), tris-8-hydroxyquinoline aluminum (Alq3), and the like, but is not limited thereto. These layers may be formed through a vacuum evaporation method, but is not limited thereto.

When the intermediate layer includes a high molecular weight material, the intermediate layer may have a structure including an HTL and an EML. For example, the HTL may include PEDOT, and the EML may include poly-phenylenevinylene (PPV)-based and polyfluorene-based polymer materials. The intermediate layer may be formed by screen printing, inkjet printing or laser induced thermal imaging (LITI), but is not limited thereto. The intermediate layer is not necessarily limited thereto and may have various structures.

The cathode 243 is disposed on the active area AA. As shown in FIG. 2, the cathode 243 may be disposed to cover the active area AA. For example, the cathode 243 may be formed as one body with respect to a plurality of organic light emitting elements 240 and may correspond to the plurality of anodes 241. The cathode 243 may be a (semi)transparent electrode or a reflective electrode.

When the cathode 243 is a (semi)transparent electrode, the cathode 243 may be made of a metal having a relatively low work function. The cathode 243 may include various materials and may have a structure of a single layer or a plurality of layers. Various modifications thereof can be made.

A capping layer 170 may be disposed on the cathode 243. The capping layer 170 may serve to protect the organic light emitting element 240 and also allow light emitted from the organic light emitting element 240 to be efficiently directed upwards.

An encapsulation layer 180 for protecting the organic light emitting element 240 from external oxygen or moisture may be disposed on the capping layer 170. The encapsulation layer 180 may include a first inorganic insulating layer 181, an organic insulating layer 182 and a second inorganic insulating layer 183. The encapsulation layer 180 may have an inclined surface outside the active area AA or inside the inactive area IA.

A touch part 190 for sensing a touch of a user may be disposed on the encapsulation layer 180. The touch part 190 may include a first touch insulating layer 191, a touch electrode part (or touch electrode unit) and a second touch insulating layer 199. For example, the first touch insulating layer 191 may be referred to as a lower insulating layer or a lower touch insulating film, but is not limited to the term.

For example, the second touch insulating layer 199 may be referred to as an upper insulating layer or an upper touch insulating film, but is not limited to the term.

With reference to FIG. 3, the touch electrode part includes a plurality of first touch electrodes 192 disposed in a first direction and a plurality of second touch electrodes 195 disposed in a second direction perpendicular to the first direction on the same plane. The plurality of first touch electrodes 192 may be referred to as touch signal transmitting electrodes or touch TX electrodes, but is not limited to the term. The plurality of second touch electrodes 195 may be referred to as touch signal receiving electrodes or touch RX electrodes, but is not limited to the term.

The plurality of first touch electrodes 192 are electrically connected to each other, and the plurality of second touch electrodes 195 are electrically connected to each other. For example, since the plurality of first touch electrodes 192 and the plurality of second touch electrodes 195 are formed on the same plane, connection electrodes need to be formed to make electrical connection and minimize a distance for connection. Thus, a second touch connection electrode 193 for connecting the plurality of second touch electrodes 195 to each other may be formed inside the first touch insulating layer 191.

Also, a first touch connection electrode 197 for connecting the plurality of first touch electrodes 192 to each other may be formed on the first touch insulating layer 191. For example, the first touch connection electrode 197 and the second touch connection electrode 193 may be disposed on different planes so as not to be electrically connected to each other. The first touch connection electrode 197 and the second touch connection electrode 193 may electrically connect the plurality of first touch electrodes 192 and the plurality of second touch electrodes 195, respectively. The first or second touch connection electrode 197 or 193 may be referred to as a touch electrode connection line, a touch bridge electrode or a touch bridge line, but is not limited to the term.

With reference to FIG. 2, touch routing lines TRL are disposed on the inactive area IA in order to apply electrical signals to the touch electrode part of the touch part 190 on the active area AA. The touch routing lines TRL may be referred to as touch connection lines or touch routing lines, but are not limited to the term.

The organic light emitting element 240 needs to have the cathode 243, and a predetermined electrical signal needs to be applied to the cathode 243 in order to display an image. In general, a predetermined reference voltage or a signal for grounding may be applied. Accordingly, the VSS line 410 may be located in the inactive area IA and transfer a predetermined electrical signal to the cathode 243. The cathode 243 according to an embodiment of the present disclosure may be referred to as a negative electrode, a facing electrode, an upper electrode or a second electrode, but is not limited to the term. The cathode 243 may have a part in the active area AA that is part of one or more light emitting elements 240, and also may have a second part in the inactive area IA.

FIG. 2 is a cross-sectional view of the inactive area IA disposed on the side of the active area AA as taken along the line I-I' of FIG. 1. The gate driver (or GIP) 300, a first structure 330 and a second structure 460 may be disposed in the inactive area IA sequentially from to the active area AA.

The first structure 330 is configured to suppress the permeation of oxygen or moisture into an organic light emitting element 240 of the active area AA from the outside of the display panel 100. The first structure 330 may be referred to as an anti-moisture permeation structure or a dam, but is not limited to the term. The first structure 330 may include an (1-1)th structure 331 and an (1-2)th structure 332. For example, the (1-1)th structure 331 and the (1-2)th structure 332 may be referred to as anti-moisture permeation structures or dams, but are not limited to the term.

The second structure 460 is configured to suppress the transfer of cracks into the display panel 100 during a scribing process for dividing a mother substrate into individual display panels 100. The second structure 460 may be referred to as an anti-crack structure, a crack stopper or an outermost dam, but is not limited to the term.

The second structure 460 according to an embodiment of the present disclosure may suppress the damage to the GIP 300, the ESD 500 or the VSS line 410 formed in the inactive area IA by an impact generated at a trimming line of the substrate 110 during a scribing process. Also, the second structure 460 may suppress the growth of a dark spot or generation of pixel shrinkage caused by a moisture permeation path provided to the organic light emitting element 240 or array formed in the active area AA.

For example, the second structure 460 may be formed as an inorganic layer or an organic layer, or may be formed as a multi-layered structure of an inorganic layer and an organic layer, but is not limited thereto. The second structure 460 may be disposed in both long sides and/or one short side of the display panel 100, but is not limited thereto.

In an area adjacent to the trimming line of the substrate 110 which is outside the second structure 460, a part or all of insulating layers (GI, buffer layer, etc.) deposited over the entire surface when the active area AA is formed may be etched. A small amount of insulating layer may be left on the substrate 110 or a top surface of the substrate 110 is completely exposed through etching. Thus, it is possible to suppress the transfer of a scribing impact to the corresponding insulating layer.

The gate driver 300 may be composed of an emission signal driver 310, a scan signal driver 320 and a link unit (not shown). The circuit configuration may vary depending on the configuration of the organic light emitting element 240. The gate driver 300 may transmit at least one emission control signal and at least one scan control signal to the subpixel including the organic light emitting element 240. The link unit may be disposed between the emission signal driver 310 and the organic light emitting element 240 and between the scan signal driver 320 and the organic light emitting element 240 for transmitting the signals. Each of the emission signal driver 310 and the scan signal driver 320 may include a plurality of transistors and at least one capacitor. On the gate driver 300, the planarization layer 150 and the bank layer 160 may be extended and disposed in the active area AA.

With reference to FIG. 2, the gate driver 300 includes the emission signal driver 310 and the scan signal driver 320, and for example, the emission signal driver 310 may be disposed outside the scan signal driver 320. However, the locations of the emission signal driver 310 and the scan signal driver 320 are not limited thereto. In order to suppress the permeation of moisture from the outside, an isolation structure for disconnecting parts of the planarization layer 150 and the bank layer 160, which are the main paths of the moisture, may be formed between the emission signal driver 310 and the scan signal driver 320. For example, the planarization layer 150 and the bank layer 160 may be etched to form an opening part OP that exposes the protective film covering the gate driver 300 or the substrate 110 between the emission signal driver 310 and the scan signal driver 320. The external moisture moving through the planarization layer 150 and the bank layer 160 may not move at the etched portion due to the isolation structure.

Also, due to the isolation structure, the first structure 330 may be separately disposed at ends of the extended planarization layer 150 and bank layer 160. The first structure 330 may include the (1-1)th structure 331 and the (1-2)th structure 332 which may be disposed sequentially from the active area AA. The first structure 330 may be made of the same material or the substantially same material as the planarization layer 150 and the bank layer 160 extended from the active area AA. The cathode 243 may be extended from the active area AA and disposed on the opening part OP.

With reference to FIG. 2, the cathode 243 may be extended to the first structure 330. For example, the cathode 243 may be extended to a side surface of the (1-1)th structure 331. The cathode 243 may be extended to the opening part OP formed by etching the planarization layer 150 and the bank layer 160 so as to be in contact with the side surface of the (1-1)th structure 331. The capping layer 170 may be extended on the cathode 243. An area where the capping layer 170 is extended may overlap with an area of the cathode 243, or may be extended to the cathode 243 and disposed on the side surface of the (1-1)th structure 331. The encapsulation layer 180 disposed on the capping layer 170 may be extended from the active area AA and extended over the (1-2)th structure 332 to a periphery of the second structure 460. The organic insulating layer 182 of the encapsulation layer 180 may be removed so as not to be in contact with the side surface of the (1-1)th structure 331.

The encapsulation layer 180 includes the first inorganic insulating layer 181 and the second inorganic insulating layer 183 and thus may be disposed so as not to be in contact with the second structure 460. Cracks generated at the substrate 110 during a scribing process of the display panel 100 may reach the second structure 460, and the second structure 460 may absorb the impact. When the encapsulation layer 180 is disposed so as to be in contact with the second structure 460, the cracks may be transferred through the first inorganic insulating layer 181 and the second inorganic insulating layer 183 of the encapsulation layer 180. In order to suppress this problem, the second structure 460 and the encapsulation layer 180 may be disposed at a certain distance from each other.

A part of the touch routing line TRL disposed on the encapsulation layer 180 may be extended to the first structure 330. The first touch insulating layer 191 included in the touch part 190, the first electrode 610 made of the same material or the substantially same material as the touch routing line TRL, and the second touch insulating layer 199 may be extended from the active area AA and disposed on the first structure 330. The first electrode 610 may be made of the same material or the substantially same material as the touch routing line TRL. The first electrode 610 may be electrically disconnected from the touch routing line TRL and connected to the VSS line 410. For example, the first electrode 610 may be extended to the substrate 110 along the inclined surface of the encapsulation layer 180.

A contact hole 620 exposing a top surface of the cathode 243 may be formed at a location adjacent to one side surface of the (1-1)th structure 331 by etching the capping layer 170, and the first inorganic insulating layer 181 and the second inorganic insulating layer 183 of the encapsulation layer 180. The second part of the cathode 243 may contact the first electrode 610 between the scan signal driver 310 and the emission scan driver 320.

The first electrode 610 may be electrically connected to the cathode 243 through the contact hole 620. Through the electrical connection between the cathode 243 and the first electrode 610, a base voltage, for example, ground power for driving the organic light emitting element 240 may be supplied.

The second touch insulating layer 199 may be extended to the second structure 460 so as to fully cover the first touch insulating layer 191 and the first electrode 610. The second touch insulating layer 199 may cover one side wall (or one side) of the second structure 460 and absorb oxygen, moisture and/or cracks that can be introduced from the outside.

The connection structure of the first electrode 610 and the cathode 243 can reduce a spatial limitation compared to the source/drain electrodes 230 serving as the VSS lines 410. The source/drain electrodes 230 are made of the same material or the substantially same material as the gate driver 300. Thus, in order to form the VSS lines 410 of the same material or the substantially same material, they need to be disposed in a separate space outside the gate driver 300 so as not to overlap with the gate driver 300. Therefore, the inactive area IA may increase in size. Also, in order to connect the cathode 243 and the VSS lines 410 formed as the source/drain electrodes 230, a separate intermediate electrode that is formed of the same material or the substantially same material by the same process as the anode 241 may be needed. The first electrode 610 and the VSS line 410 may be connected outside the gate driver 300. For example, the connection structure of the cathode 243, the intermediate electrode, and the VSS line 410 occupies a large space in the inactive area IA. Such an increase in size of the inactive area IA may result in an increase in size of the bezel area.

The first electrode 610 according to an embodiment of the present disclosure is formed of the same material or the substantially same material by the same process as the touch routing line TRL disposed on the organic light emitting element 240. Thus, the first electrode 610 may be disposed so as to overlap with the gate driver 300 in an outer part of the inactive area IA. Also, both the first electrode 610 and the cathode 243 are disposed on the gate driver 300, and, thus, a connection structure thereof is simple. The first electrode 610 and the cathode 243 can be directly connected to each other without a separate intermediate electrode.

With reference to FIG. 2, the first electrode 610 may be electrically connected to the cathode 243 through the contact hole 620 adjacent to the one side surface of the (1-1)th structure 331 close to the active area AA. Since the contact hole 620 is disposed closest to the cathode 243, it is possible to compensate for a resistance of the cathode 243 having a relatively high electrical resistance. Since the cathode 243 can be formed to a small thickness of from about 100 Å to about 200 Å, it may have a higher electrical resistance than other metal lines. The location of the contact hole 620 shown in FIG. 2 can be applied when the organic insulating layer 182 of the encapsulation layer 180 can be controlled so as not to go over the (1-1)th structure 331.

According to an embodiment of the present disclosure, a narrow bezel can be implemented without a separate intermediate electrode due to the direct connection structure of the first electrode 610 and the cathode 243. Since even narrower bezels are being demanded by the market, the inventors of the present disclosure conducted various experiments to achieve them. The inventors conducted various experiments to reduce the width of a bezel and suppress degradation in various driving characteristics of a display apparatus without an additional process. Through the various experiments, the inventors have invented a display apparatus in which various driving characteristics are not degraded and the width of a bezel is reduced without an additional process.

In another embodiment of the present disclosure, the first electrode 610 connected to the cathode 243 is formed of the same material or the substantially same material by the same process as the second touch connection electrode 193 of the touch part 190. Thus, the width of a bezel can be further reduced without an additional process. Details thereof will be described below.

Figure 4:
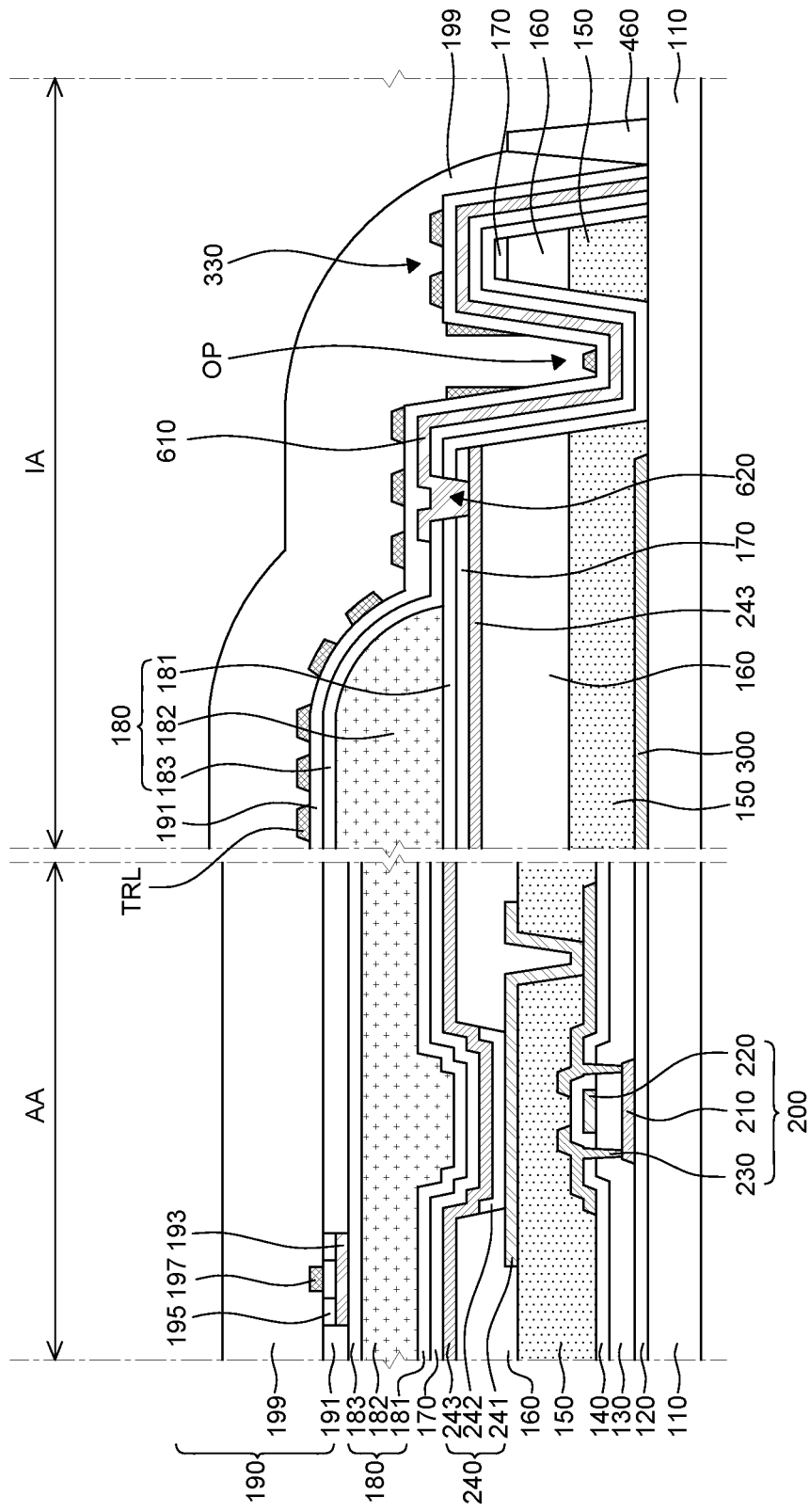
FIG. 4 is another cross-sectional view taken along the line I-I' of FIG. 1 according to an embodiment of the present disclosure.

FIG. 4 is a cross-sectional view of the inactive area IA on a side of the active area AA as taken along the line I-I' of FIG. 1 according to an embodiment of the present disclosure.

With reference to FIG. 4, the thin film transistor 200 is disposed in the active area AA of the substrate 110. The organic light emitting element 240 may also be disposed in the active area AA. Some parts of the active area AA shown in FIG. 4 have the same or similar structure as shown in FIG. 2. Therefore, description thereof may be omitted or provided briefly.

The gate driver (GIP) 300, the first structure 330 and the second structure 460 may be disposed in the inactive area IA sequentially from to the active area AA. The first structure 330 may be referred to as an anti-moisture permeation structure or a dam, but is not limited to the term. The second structure 460 may be referred to as an anti-crack structure, a crack stopper, or an outermost dam, but is not limited to the term.

With reference to FIG. 4, in order to suppress the permeation of moisture from the outside, an isolation structure for disconnecting parts of the planarization layer 150 and the bank layer 160, which are the main paths of the moisture, may be formed. For example, the planarization layer 150 and the bank layer 160 may be etched to form the opening part OP that exposes the substrate 110. The external moisture moving through the planarization layer 150 and the bank layer 160 may not move, for example, in the opening part OP.

Due to the isolation structure, the first structure 330 may be separately disposed at the ends of the extended planarization layer 150 and bank layer 160. The first structure 330 may be made of the same material or the substantially same material as the planarization layer 150 and the bank layer 160 extended from the active area AA.

With reference to FIG. 4, the cathode 243 may be extended to the inactive area IA. For example, the cathode 243 may be extended to right before the opening part OP. For example, the cathode 243 may be extended to right before the opening part OP formed by etching the planarization layer 150 and the bank layer 160. The capping layer 170 may be extended on the cathode 243. For example, an area where the capping layer 170 is extended may be the same as an area where the cathode 243 is extended. The encapsulation layer 180 disposed on the capping layer 170 may be extended from the active area AA and extended over the first structure 330 to a periphery of the second structure 460. The organic insulating layer 182 of the encapsulation layer 180 may be removed so as not to be formed in the opening part OP.

The encapsulation layer 180 includes the first inorganic insulating layer 181 and the second inorganic insulating layer 183 and thus may be disposed so as not to be in contact with the second structure 460. Cracks generated at the substrate 110 during a scribing process of the display panel 100 may be transferred to the second structure 460, and the second structure 460 may absorb the impact. When the encapsulation layer 180 is disposed so as to be in contact with the second structure 460, the cracks may be transferred through the first inorganic insulating layer 181 and the second inorganic insulating layer 183 of the encapsulation layer 180. In order to suppress the transfer of cracks, the second structure 460 and the encapsulation layer 180 may be disposed at a certain distance from each other.

The contact hole 620 exposing the top surface of the cathode 243 may be formed between an end of the organic insulating layer 182 of the encapsulation layer 180 and the opening part OP by etching the capping layer 170, and the first inorganic insulating layer 181 and the second inorganic insulating layer 183 of the encapsulation layer 180. Thus, the second part of the cathode 243 in the inactive area IA may be exposed through the contact hole 620, and the second part of the cathode 243 may contact the first electrode 610 above the gate driver 300. Accordingly, the organic insulating layer 182 may be disposed so as not to overlap with the contact hole 620.

The first electrode 610 may be electrically connected to the cathode 243 through the contact hole 620. The first electrode 610 may be referred to as a connection electrode or an intermediate electrode, but is not limited to the term. The first electrode 610 may be disposed between the contact hole 620 and the second structure 460. Through the electrical connection between the cathode 243 and the first electrode 610, a base voltage, for example, ground power for driving the organic light emitting element 240 may be supplied.

After the encapsulation layer 180 is completely formed and the contact hole 620 exposing the top surface of the cathode 243 is formed through the etching process, the first electrode 610 may be formed. The first electrode 610 may be formed using a process of forming the second touch connection electrode 193 of the touch electrode part. For example, the second touch connection electrode 193 and the first electrode 610 may be formed of the same material or the substantially same material by the same process. For example, the first electrode 610 is formed of the same material or the substantially same material by the existing process of forming the second touch connection electrode 193, and, thus, an additional process is not needed. Also, the location of the contact hole 620 is moved closer to the active area AA than shown in FIG. 2, and, thus, the inactive area IA can be reduced by as much as the thickness, which makes it easier to implement a narrow bezel. The placement of a single anti-moisture permeation structure or first structure 330 can further reduce the space, which is more effective in implementing a narrow bezel.

A part of the touch part 190 disposed on the encapsulation layer 180 may be extended to the first structure 330. The first touch insulating layer 191 and the second touch insulating layer 199 of the touch part 190 may be extended from the active area AA and disposed on the first structure 330. The first electrode 610 may be disposed inside the first touch insulating layer 191 from the contact hole 620 of the inactive area IA and may be further on the first structure 330. The first electrode 610 may be made of the same material or the substantially same material as the second touch connection electrode 193. The first electrode 610 may be electrically disconnected from the second touch connection electrode 193 and connected to the VSS line 410.

The second touch insulating layer 199 may cover the first structure 330 and may be in contact with one side of the second structure 460. The second touch insulating layer 199 may be formed on the entire surface of the active area AA and the inactive area IA. Thus, the second touch insulating layer 199 can reduce a height variation of the entire display apparatus. Since cracks from the outside are suppressed by the second structure 460, the second touch insulating layer 199 may not cover the second structure 460 but may be disposed in contact with or adjacent to the one side of the second structure 460.

The touch routing line TRL may be disposed on the entire surface of the inactive area IA. The touch routing line TRL may be made of the same material or the substantially same material by the same process as the first touch connection electrode 197. The touch routing line TRL may be disposed on the first touch insulating layer 191 or inside the second touch insulating layer 199 in the inactive area IA. According to an embodiment of the present disclosure, the touch routing line TRL is disposed on the entire surface of the reduced inactive area IA, and, thus, a space of the inactive area IA can be used efficiently.

According to an embodiment of the present disclosure, a connection structure between the cathode 243 and the first electrode 610 may occupy a smaller space in the inactive area IA than the connection structure between the cathode 243 and the source/drain electrodes 230 as connection electrodes of the VSS lines 410 or the connection structure between the cathode 243 and the touch routing line TRL shown as the first electrode 610 in FIG. 2. The connection structure of the cathode 243, the first electrode 610 and the VSS line 410 shown in FIG. 2 needs a larger space in the inactive area IA than the connection structure according to the embodiment of the present disclosure. Such an increase in size of the inactive area IA may result in an increase in size of the bezel area.

The first electrode 610 shown in FIG. 2 is formed of the same material or the substantially same material by the same process as the touch routing line TRL of the touch electrode part disposed on the organic light emitting element 240. Thus, the first electrode 610 may be disposed so as to overlap with the gate driver 300 in the outer part of the inactive area IA. Also, both the first electrode 610 and the cathode 243 are disposed on the gate driver 300, and, thus, a connection structure thereof is simple. The first electrode 610 and the cathode 243 may be directly connected to each other without a separate intermediate electrode.

The first electrode 610 shown in FIG. 4 may be formed of the same material or the substantially same material by the same process as the second touch connection electrode 193 of the touch electrode part disposed on the organic light emitting element 240. The location of the contact hole 620 through which the first electrode 610 may be connected to the cathode 243 is moved closer to the active area AA. Thus, the first electrode 610 may be disposed so as to overlap with the gate driver 300 in the outer part of the inactive area IA. Also, both the first electrode 610 and the cathode 243 may be disposed on the gate driver 300, and, thus, a connection structure thereof is simple. The first electrode 610 and the cathode 243 may be directly connected to each other without a separate intermediate electrode, which makes it possible to reduce the inactive area IA and makes it easier to implement a narrow bezel. Also, the efficiency of a process for controlling coating of the second touch insulating layer 199 on the entire surface of the substrate 110 increases. Thus, the first structure 330 does not need to be provided in plural, i.e., the (1-1)th structure 331 and the (1-2)th structure 332 as shown in FIG. 2. Since the touch routing line TRL is formed on the entire surface of the inactive area IA, the space of the inactive area IA can be further reduced.

Figure 5:
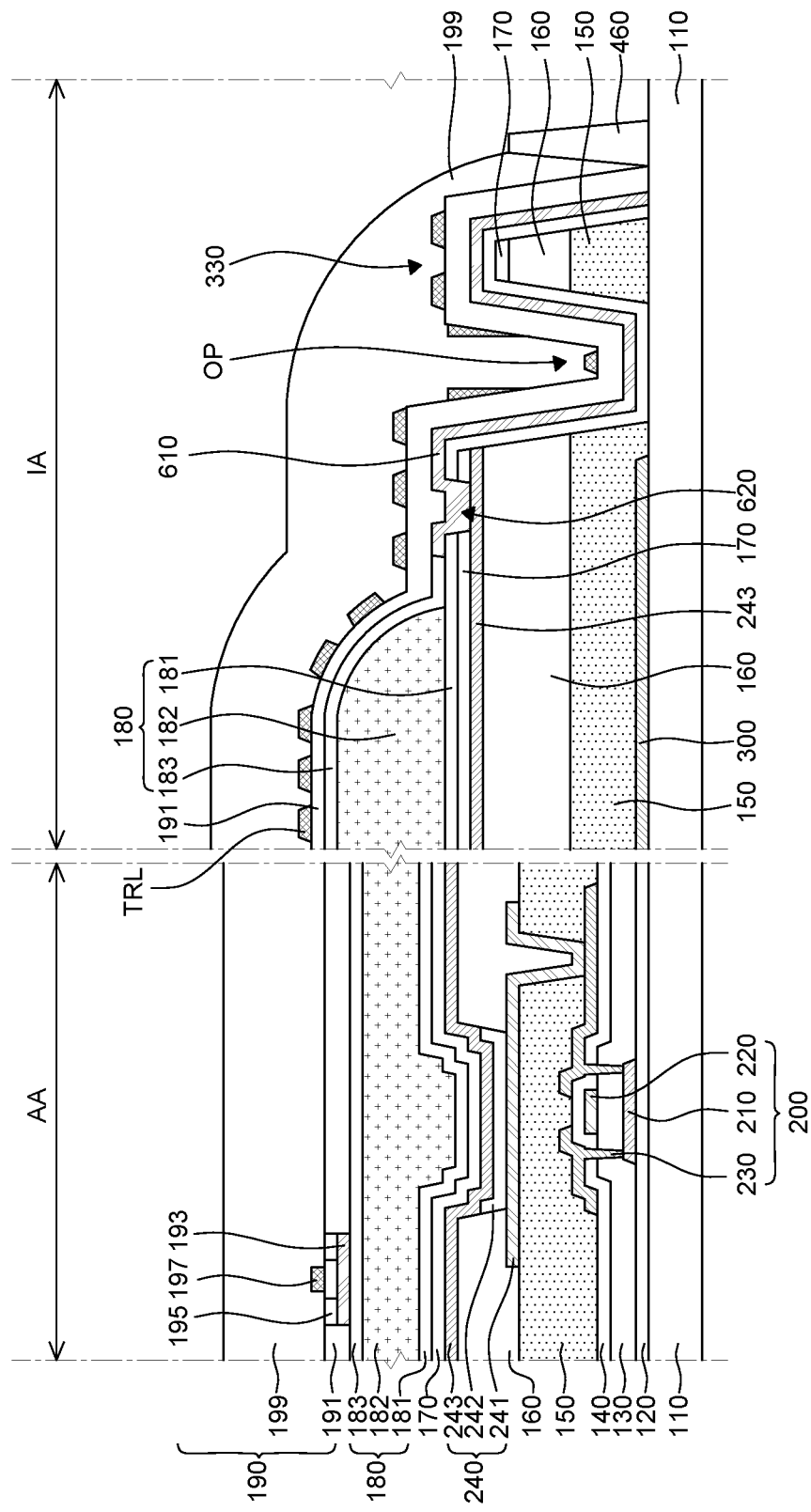
FIG. 5 is another cross-sectional view taken along the line I-I' of FIG. 1 according to an embodiment of the present disclosure.

FIG. 5 is a cross-sectional view of the inactive area IA disposed on a side of the active area AA as taken along the line I-I' of FIG. 1 according to an embodiment of the present disclosure.

With reference to FIG. 5, the thin film transistor 200 is disposed in the active area AA of the substrate 110. The organic light emitting element 240 may also be disposed in the active area AA. Some parts of the active area AA shown in FIG. 5 has the similar or same structure as shown in FIG. 2. Therefore, description thereof may be omitted or provided briefly.

The gate driver (GIP) 300, the first structure 330 and the second structure 460 may be disposed in the inactive area IA sequentially from to the active area AA. The first structure 330 may be referred to as an anti-moisture permeation structure, or a dam, but is not limited to the term. The second structure 460 may be referred to as an anti-crack structure, a crack stopper or an outermost dam, but is not limited to the term.

With reference to FIG. 5, in order to suppress the permeation of moisture from the outside, an isolation structure for disconnecting parts of the planarization layer 150 and the bank layer 160, which are the main paths of the moisture, may be formed. For example, the planarization layer 150 and the bank layer 160 may be etched to form the opening part OP that exposes the substrate 110. The external moisture moving through the planarization layer 150 and the bank layer 160 may not move, for example, in the opening part OP.

Due to the isolation structure, the first structure 330 may be separately disposed at the ends of the extended planarization layer 150 and bank layer 160. The first structure 330 may be made of the same material or the substantially same material as the planarization layer 150 and the bank layer 160 extended from the active area AA.

With reference to FIG. 5, the cathode 243 may be extended to the inactive area IA. For example, the cathode 243 may be extended to right before the opening part OP. For example, the cathode 243 may be extended to right before the opening part OP formed by etching the planarization layer 150 and the bank layer 160.

The capping layer 170 may be extended on the cathode 243, and an area where the capping layer 170 is extended may be the same as the cathode 243. For example, the area where the capping layer 170 is extended may be on the same plane as the cathode 243.

The encapsulation layer 180 disposed on the capping layer 170 may be extended from the active area AA and extended over the first structure 330 to a periphery of the second structure 460. The organic insulating layer 182 and the second inorganic insulating layer 183 of the encapsulation layer 180 may be removed so as not to be formed in the opening part OP. The encapsulation layer 180 includes the first inorganic insulating layer 181 and thus may be disposed so as not to be in contact with the second structure 460. Cracks generated at the substrate 110 during a scribing process of the display panel 100 may be transferred to the second structure 460, and the second structure 460 may absorb the impact. When the encapsulation layer 180 is disposed so as to be in contact with the second structure 460, the cracks may be transferred through the first inorganic insulating layer 181 of the encapsulation layer 180. In order to suppress the transfer of cracks, the second structure 460 and the encapsulation layer 180 may be disposed at a certain distance from each other.

The contact hole 620 exposing the top surface of the cathode 243 may be formed between the end of the organic insulating layer 182 of the encapsulation layer 180 and the opening part OP by etching the capping layer 170, and the first inorganic insulating layer 181 and the second inorganic insulating layer 183 of the encapsulation layer 180. Thus, a portion of the second part of the cathode 243 in the inactive area IA may be exposed through the contact hole 620. Accordingly, the organic insulating layer 182 may be disposed so as not to overlap with the contact hole 620.

An end of the second inorganic insulating layer 183 may be in contact with a side surface of the first electrode 610. Since the first electrode 610 is disposed on the first inorganic insulating layer 181 rather than on the second inorganic insulating layer 183, the second inorganic insulating layer 183 may be formed on the first electrode 610. However, if the subsequent first touch insulating layer 191 is made of the same material or the substantially same material as the second inorganic insulating layer 183, the end of the second inorganic insulating layer 183 may be in contact with the side surface of the first electrode 610. In this case, the subsequent first touch insulating layer 191 is formed on the entire surface of the active area AA and the inactive area IA. Therefore, the number of processes for manufacturing the display apparatus can be reduced.

The first electrode 610 may be electrically connected to the cathode 243 through the contact hole 620. The first electrode 610 may be referred to as a connection electrode or an intermediate electrode, but is not limited to the term. The first electrode 610 may be disposed between the contact hole 620 and the second structure 460. Through the electrical connection between the cathode 243 and the first electrode 610, a base voltage, for example, ground power for driving the organic light emitting element 240 may be supplied.

After the encapsulation layer 180 is completely formed and the contact hole 620 exposing the top surface of the cathode 243 is formed through the etching process, the first electrode 610 may be formed. The first electrode 610 may be formed using a process of forming the second touch connection electrode 193 of the touch electrode part. For example, the second touch connection electrode 193 and the first electrode 610 may be formed of the same material or the substantially same material by the same process. For example, the first electrode 610 is formed of the same material or the substantially same material by the existing process of forming the second touch connection electrode 193 without an additional process. For example, the location of the contact hole 620 is moved closer to the active area AA than shown in FIG. 2, and, thus, the inactive area IA can be reduced by as much as the thickness, which makes it easier to implement a narrow bezel.

Also, the efficiency of a process for controlling coating of the second touch insulating layer 199 on the entire surface of the substrate 110 may increase. Thus, the first structure 330 is not necessarily provided in plural, i.e., the (1-1)th structure 331 and the (1-2)th structure 332 as in the first embodiment. Since the touch routing line TRL is formed on the entire surface of the inactive area IA, the space of the inactive area IA can be further reduced.

A part of the touch part 190 disposed on the encapsulation layer 180 may be extended to the first structure 330. The first touch insulating layer 191 and the second touch insulating layer 199 of the touch part 190 may be extended from the active area AA and disposed on the first structure 330.

The first electrode 610 may be disposed inside or under the first touch insulating layer 191 from the contact hole 620 of the inactive area IA and may be further disposed on the first structure 330. The first electrode 610 may be made of the same material or the substantially same material as the second touch connection electrode 193 but may be electrically disconnected from the second touch connection electrode 193. The first electrode 610 may be connected to the VSS line 410.

The touch routing line TRL may be disposed on the entire surface of the inactive area IA. The touch routing line TRL may be made of the same material or the substantially same material by the same process as the first touch connection electrode 197. The touch routing line TRL may be disposed on the first touch insulating layer 191 or inside the second touch insulating layer 199 in the inactive area IA. According to an embodiment of the present disclosure, the touch routing line TRL is disposed on the entire surface of the reduced inactive area IA, and, thus, a reduction of the inactive area IA can be maximized.

The second touch insulating layer 199 may be extended to the second structure 460 so as to fully cover the first touch insulating layer 191 and the first electrode 610. The second touch insulating layer 199 may cover one side wall (or one side) of the second structure 460 and absorb oxygen, moisture and/or cracks that can be introduced from the outside.

The connection structure of the first electrode 610 and the cathode 243 can reduce a spatial limitation compared to the source/drain electrodes 230 serving as the VSS lines 410 or the touch routing line TRL.

The first electrode 610 shown in FIG. 2 is formed of the same material or the substantially same material by the same process as the touch routing line TRL disposed on the organic light emitting element 240. Thus, the first electrode 610 may be disposed so as to overlap with the gate driver 300 in the outer part of the inactive area IA. Also, both the first electrode 610 and the cathode 243 are disposed on the gate driver 300, and, thus, a connection structure thereof is simple. The first electrode 610 and the cathode 243 can be directly connected to each other without a separate intermediate electrode.

The first electrode 610 shown in FIG. 4 and FIG. 5 is formed of the same material or the substantially same material by the same process as the second touch connection electrode 193 of the touch electrode part disposed on the organic light emitting element 240. The location of the contact hole 620 through which the first electrode 610 is connected to the cathode 243 is moved closer to the active area AA. Thus, the first electrode 610 may be disposed so as to overlap with the gate driver 300 in the outer part of the inactive area IA.

Since both the first electrode 610 and the cathode 243 are disposed on the gate driver 300, a connection structure thereof is simple. The first electrode 610 and the cathode 243 can be directly connected to each other without a separate intermediate electrode, which makes it possible to reduce the inactive area IA and makes it easier to implement a narrow bezel. Also, the efficiency of a process for controlling coating of the second touch insulating layer 199 on the entire surface of the substrate 110 increases. Thus, the first structure 330 is not necessarily provided in plural, i.e., the (1-1)th structure 331 and the (1-2)th structure 332 as shown in FIG. 2. Since the touch routing line TRL is formed on the entire surface of the inactive area IA, the space of the inactive area IA can be further reduced.

According to the embodiments of the present disclosure described above with reference to FIG. 2, FIG. 4 and FIG. 5, the contact hole 620, the opening part OP and the first structure 330 may be commonly disposed on at least three sides of the inactive area IA surrounding the active area AA shown in FIG. 1.

The electrical connection (or electrical contact) structure between the first electrode 610 and the cathode 243 described above with reference to FIG. 2 through FIG. 5 will be described below.

With reference to FIG. 2 through FIG. 5, the display panel 100 is located on the substrate 110. The display panel 100 may include the planarization layer 150 disposed in the active area AA and the inactive area IA, and the first structure 330 disposed outside the encapsulation layer 180 and located on the planarization layer 150 in the inactive area IA.

The first structure 330 may include an anti-moisture permeation material layer located on the planarization layer 150. For example, the anti-moisture permeation material layer may be made of the same material or the substantially same material as or a different material from the bank layer 160 located on the planarization layer 150.

The first structure 330 may include only the anti-moisture permeation material layer, but may be formed as a multi-layered structure further including the planarization layer 150.

With reference to FIG. 4 and FIG. 5, the planarization layer 150 may have the contact hole 620 between the active area AA and the first structure 330, for example, between the organic insulating layer 182 and the opening part OP. The first electrode 610 may be in electrical contact with the cathode 243 at the contact hole 620.

With reference to FIG. 4, the first electrode 610 may be disposed on the second inorganic insulating layer 183. The first electrode 610 may be formed of the same material or the substantially same material by the same process as the second touch connection electrode 193 of the touch part 190.

With reference to FIG. 5, the first electrode 610 may be disposed on the first inorganic insulating layer 181. The end of the second inorganic insulating layer 183 may be in contact with the side surface of the first electrode 610. The first electrode 610 may be formed of the same material or the substantially same material by the same process as the second touch connection electrode 193 of the touch part 190.

The embodiments of the present disclosure can also be described as follows:

A display apparatus according to an embodiment of the present disclosure comprises, a substrate including an active area and an inactive area disposed around the active area. The display apparatus further includes a light emitting element disposed in the active area and including an anode, an emission layer and a cathode. The display apparatus further includes an encapsulation layer disposed on the light emitting element and including a first inorganic insulating layer, an organic insulating layer and a second inorganic insulating layer. The display apparatus further includes a touch part disposed on the encapsulation layer and including a first touch insulating layer, a touch electrode part and a second touch insulating layer. The display apparatus further includes a contact hole disposed in the inactive area and exposing an upper portion of the cathode covering the entire active area and a part of the inactive area. The display apparatus further includes a first electrode electrically connected to the cathode through the contact hole in the inactive area. The touch electrode part and the first electrode are made of the same material or the substantially same material.

According to some embodiments of the present disclosure, the touch electrode part may include a plurality of first touch electrodes, a plurality of second touch electrodes, a plurality of first touch connection electrodes disposed on the first touch insulating layer and connecting the plurality of first touch electrodes, and a plurality of second touch connection electrodes disposed inside the first touch insulating layer and connecting the plurality of second touch electrodes.

According to some embodiments of the present disclosure, the plurality of second touch connection electrodes and the first electrode may be made of the same material or the substantially same material by the same process.

According to some embodiments of the present disclosure, the first electrode may be disposed on the first inorganic insulating layer.

According to some embodiments of the present disclosure, an end of the second inorganic insulating layer may be in contact with a side surface of the first electrode.

According to some embodiments of the present disclosure, the first electrode may be disposed on the second inorganic insulating layer.

According to some embodiments of the present disclosure, the display apparatus may further include a planarization layer disposed in the active area and the inactive area, a bank layer disposed on the planarization layer, an opening exposing the substrate by opening a part of the planarization layer and a part of the bank layer in the inactive area, a first structure disposed between the opening and an end of the substrate, and a second structure disposed between the first structure and the end of the substrate.

According to some embodiments of the present disclosure, the second touch insulating layer may cover the first structure and may be in contact with one side of the second structure.

According to some embodiments of the present disclosure, the contact hole may be disposed between the organic insulating layer and the opening.

According to some embodiments of the present disclosure, the organic insulating layer may not overlap with the contact hole.

According to some embodiments of the present disclosure, the first electrode may be disposed between the contact hole and the second structure.

According to some embodiments of the present disclosure, the display apparatus may further include a gate driver disposed in the inactive area. A part of the gate driver may overlap with a part of the first electrode.

According to some embodiments of the present disclosure, the display apparatus may further include a capping layer disposed between the light emitting element and the encapsulation layer.

According to some embodiments of the present disclosure, the contact hole may be formed between an end of the organic insulating layer of the encapsulation layer and the opening by etching the capping layer, the first inorganic insulating layer and the second inorganic insulating layer.

It will be apparent to those skilled in the art that various modifications and variations can be made in the present disclosure without departing from the technical idea or scope of the disclosures. Thus, it is intended that the present disclosure cover the modifications and variations of this disclosure provided they come within the scope of the appended claims and their equivalents.

What is claimed is:

1. A display apparatus, comprising:
a substrate including an active area and an inactive area disposed around the active area;
a light emitting element disposed in the active area and including an anode, an emission layer and a cathode, the cathode covering an entire active area and a part of the inactive area;

an encapsulation layer disposed on the light emitting element and including a first inorganic insulating layer, an organic insulating layer, and a second inorganic insulating layer;
a touch part disposed on the encapsulation layer and including a first touch insulating layer, a touch electrode part, and a second touch insulating layer;
a contact hole disposed in the inactive area and exposing an upper portion of the cathode in the inactive area; and
a first electrode electrically connected to the cathode through the contact hole in the inactive area, the first electrode and the touch electrode part including a same material.

2. The display apparatus of claim 1, wherein the touch electrode part includes:
a plurality of first touch electrodes;
a plurality of second touch electrodes;
a plurality of first touch connection electrodes disposed on the first touch insulating layer and connecting the plurality of first touch electrodes; and
a plurality of second touch connection electrodes disposed in the first touch insulating layer and connecting the plurality of second touch electrodes.

3. The display apparatus of claim 2, wherein the plurality of second touch connection electrodes and the first electrode are formed of a same material by a same process.

4. The display apparatus of claim 1, wherein the first electrode is disposed on the first inorganic insulating layer.

5. The display apparatus of claim 4, wherein an end of the second inorganic insulating layer is in contact with a side surface of the first electrode.

6. The display apparatus of claim 1, wherein the first electrode is disposed on the second inorganic insulating layer.

7. The display apparatus of claim 1, further comprising:
a planarization layer disposed in the active area and the inactive area;
a bank layer disposed on the planarization layer;
an opening part exposing the substrate by opening a part of the planarization layer and a part of the bank layer in the inactive area;
a first structure between the opening part and an end of the substrate; and
a second structure between the first structure and the end of the substrate.

8. The display apparatus of claim 7, wherein the second touch insulating layer covers the first structure and is in contact with one side of the second structure.

9. The display apparatus of claim 7, wherein the contact hole is disposed between the organic insulating layer and the opening part.

10. The display apparatus of claim 7, wherein the organic insulating layer does not overlap with the contact hole.

11. The display apparatus of claim 7, wherein the first electrode is disposed between the contact hole and the second structure.

12. The display apparatus of claim 1, further comprising:
a gate driver disposed in the inactive area,
wherein a part of the gate driver overlaps with a part of the first electrode.

13. The display apparatus of claim 1, further comprising:
a capping layer between the light emitting element and the encapsulation layer.

14. The display apparatus of claim 9, further comprising:
a capping layer between the light emitting element and the encapsulation layer,
wherein the contact hole is disposed between an end of the organic insulating layer of the encapsulation layer and the opening part by etching the capping layer, the first inorganic insulating layer, and the second inorganic insulating layer.

15. A display apparatus, comprising:
a substrate including an active area and an inactive area;
at least one light emitting element disposed in the active area, the at least one light emitting element including an anode, an emission layer, and a at least a part of a cathode;
a second part of the cathode in the inactive area of the substrate;
an encapsulation layer disposed on the light emitting element;
a touch part and one or more touch routing lines disposed on the encapsulation layer, wherein the one or more touch routing lines electrically connect the touch part to a touch pad;
a gate driver disposed in the inactive area of the substrate; and
a first electrode formed in a same layer as a part of the touch part, wherein the first electrode contacts the second part of the cathode, and the first electrode overlaps with the gate driver.

16. The display apparatus of claim 15, wherein at least a part of the encapsulation layer is disposed on the second part of the cathode, and is formed with a contact hole exposing the second part of the cathode, and wherein the first electrode contacts the exposed portion of the second part of the cathode through the contact hole.

17. The display apparatus of claim 15, wherein the touch part further comprises:
a plurality of first touch electrodes connected by first touch connection electrodes,
a plurality of second touch electrodes connected by second touch connection electrodes,
wherein the one or more touch routing lines are formed of a same material as the first touch connection electrodes, and
wherein the second touch connection electrodes are formed below the plurality of second touch electrodes, and wherein the first electrode is formed in a same layer as the second touch connection electrodes.

18. The display apparatus of claim 15, further comprising:
a thin film transistor (TFT) for driving the light emitting element in the active area, the TFT including a source electrode and a drain electrode,
wherein at least a part of the gate driver is formed as a same material as the source electrode or the drain electrode of the TFT.

19. The display apparatus of claim 15, further comprising:
a first structure disposed on or adjacent to the gate driver,
wherein the gate driver further comprises a first signal driver and a second signal driver, and
wherein the first electrode contacts the second part of the cathode between the first signal driver and the second signal driver.

20. The display apparatus of claim 19, wherein the touch part further includes a touch insulating layer, wherein at least a part of the encapsulation layer and the touch insulating layer is disposed on the second part of the cathode, and is formed with a contact hole exposing the second part of the cathode, and wherein the first electrode contacts the second part of the cathode through the contact hole.

21. The display apparatus of claim 15,
wherein the second part of the cathode is disposed on the gate driver,
and wherein the first electrode contacts the second part of the cathode at a location above the gate driver.

22. The display apparatus of claim 21, further comprising:
a bank layer disposed on at least a portion of the anode and the gate driver, wherein the first electrode contacts the second part of the cathode at a location on the bank layer.

23. The display apparatus of claim 21, wherein the touch part further includes a touch insulating layer, wherein at least a part of the encapsulation layer is disposed on the second part of the cathode, and is formed with a contact hole exposing the second part of the cathode, and wherein the first electrode contacts the second part of the cathode through the contact hole, and wherein the touch insulating layer is disposed on the first electrode.

24. The display apparatus of claim 23, wherein a side surface of the first electrode contacts a side surface of the encapsulation layer.

25. The display apparatus of claim 15, further comprising a low-potential power line disposed at a lower portion of the inactive area below the active area, wherein the gate driver is disposed at a left or right portion of the inactive area, and wherein the first electrode extends to the low-potential power line disposed at the lower portion of the inactive area.

* * * * *